US011479451B2

(12) United States Patent
Ma et al.

(10) Patent No.: US 11,479,451 B2
(45) Date of Patent: Oct. 25, 2022

(54) ROLLER REVERSING AND JACKING DEVICE FOR HANDLING EQUIPMENT (71) Applicant: LONLINK SMART STORAGE SOLUTION (SHANGHAI) CO., LTD, Shanghai (CN)

(72) Inventors: Yunlong Ma, Shanghai (CN); Yifeng Sun, Shanghai (CN); Xiaoming Huang, Shanghai (CN)

(73) Assignee: LONLINK SMART STORAGE SOLUTION (SHANGHAI) CO., LTD., Shanghai (CN)

(*) Notice: Subject to any disclaimer, the term of this patent is extended or adjusted under 35 U.S.C. 154(b) by 134 days.

(21) Appl. No.: 16/474,841

(22) PCT Filed: Jun. 25, 2018

(86) PCT No.: PCT/CN2018/092707
§ 371 (c)(1),
(2) Date: Jan. 31, 2021

(87) PCT Pub. No.: WO2019/214017
PCT Pub. Date: Nov. 14, 2019

(65) Prior Publication Data
US 2021/0139300 A1    May 13, 2021

(30) Foreign Application Priority Data

May 5, 2018  (CN) .......................... 201810422715.4

(51) Int. Cl.
B66F 7/06      (2006.01)
B66F 7/28      (2006.01)
(52) U.S. Cl.
CPC .............. B66F 7/0625 (2013.01); B66F 7/28 (2013.01)

(58) Field of Classification Search
CPC .. B66F 5/00; B66F 7/00; B66F 7/0625; B66F 9/06; B66F 9/065; B66F 9/07568;
(Continued)

(56) References Cited

U.S. PATENT DOCUMENTS 5,370,492 A * 12/1994 Gleyze ................. B65G 1/0492
                                                 414/284
9,422,108 B2 * 8/2016 Hognaland .......... B65G 1/0478
(Continued)

FOREIGN PATENT DOCUMENTS

CN         2841586        11/2006
CN       103896000 A       7/2014
(Continued)

OTHER PUBLICATIONS

International Search Report, State Intellectual Property Office of the P.R. China, application No. PCT/CN2018/092707, dated Jan. 30, 2019, 6 pages.

Primary Examiner — Lee D Wilson
Assistant Examiner — Alberto Saenz
(74) Attorney, Agent, or Firm — Ziegler IP Law Group, LLC (57) ABSTRACT A roller reversing and jacking device for handling equipment comprises a directional roller set, at least one set of reversing and jacking assemblies and a reversing roller set. The reversing and jacking assemblies comprises: a jacking slider restricted to and disposed on the frame through a slider guide post; a reversing and jacking eccentric shaft correspondingly disposed on the jacking slider, comprising an eccentric shaft segment, an eccentric roller and a transmission shaft segment; and a reversing and jacking drive motor connected to and/or disconnected from one end of the transmission shaft segment, and the reversing and jacking drive motor fixedly mounted on the frame.

12 Claims, 6 Drawing Sheets (58) Field of Classification Search
CPC ...... B66F 3/16; B60S 9/00; B60S 9/14; B60S 9/205; B60S 9/21
USPC .......................... 254/2 C, 4 B, 5 B, 8 B, 9 C
See application file for complete search history.

(56) References Cited

U.S. PATENT DOCUMENTS

2014/0086714 A1* 3/2014 Malik .................. B65G 1/0478
414/273
2017/0334643 A1* 11/2017 Itoh ...................... B65G 1/0492

FOREIGN PATENT DOCUMENTS

| | | |
|---|---|---|
| CN | 104071542 A | 10/2014 |
| CN | 103101737 B | 6/2015 |
| CN | 206298060 U | 7/2017 |
| CN | 208265207 U | 12/2018 |
| JP | H01176799 A | 7/1989 |

* cited by examiner

ROLLER REVERSING AND JACKING DEVICE FOR HANDLING EQUIPMENT

FIELD OF THE INVENTION

The invention relates to the technical field of mechanical automation, in particular to a roller reversing and jacking device for handling equipment.

DESCRIPTION OF THE PRIOR ART

Currently, handling equipment can be implemented in a variety of forms, including shuttles, stackers, RGVs, etc. However, there are mainly two sets of mechanisms for reversing the roller in the orthogonal direction on the track and achieving the jacking, which are mostly the lead screw/screw mechanism and the cylinder mechanism.

The conventional mechanism that reverses the roller in the orthogonal direction on the track and achieves the jacking for handling equipment cannot further reduce the height and weight of the equipment. The existing handling equipment requires that the object to be transported and stored has a definite size and also requires mechanisms for driving, reversing and jacking operations, as well as components such as power supplies, sensors and controllers. Thus, the functional components must be assembled in a restricted space. Even under the premise of reasonable arrangement, the body of the existing handling equipment is still bulky and heavy, and the energy consumption required for the operation of the whole components is very high. Moreover, it takes a long time for the existing handling equipment to complete the reversing and jacking action, resulting in low efficiency of the handling equipment itself.

SUMMARY OF THE INVENTION

In view of the defects existing in the above prior art, the object of the present invention is to provide a simple-structured and efficient roller reversing and jacking device for handling equipment.

To achieve the above object, the present invention provides the following technical solutions: The present invention provides a roller reversing and jacking device for handling equipment. The handling equipment described herein is a handling equipment such as a logistics shuttle, a stacker, an RGV rail shuttle, etc., which comprises a directional roller set fixedly mounted on the frame, at least one set of reversing and jacking assemblies mounted on the frame, and a reversing roller set which moves in different direction from the directional roller set, and the reversing and jacking assemblies comprise:

a jacking slider restricted to and disposed on the frame through a slider guide post, the jacking slider slidably sleeved on the slider guide post, and the jacking slider provided with the reversing roller set;

a reversing and jacking eccentric shaft correspondingly disposed on the jacking slider, comprising an eccentric shaft segment, an eccentric roller and a transmission shaft segment, and one end of the eccentric shaft segment mounted in the opening on the jacking slider; and a reversing and jacking drive motor connected to and/or disconnected from one end of the transmission shaft segment, and the reversing and jacking drive motor being fixedly mounted on the frame;

the reversing and jacking drive motor configured to drive the eccentric shaft segment on the reversing and jacking eccentric shaft to rotate with the cam, thereby driving the jacking slider and the reversing roller set thereon to move up and down with respect to the frame and the directional roller set.

Further, the reversing and jacking assemblies are at least two sets; the reversing roller sets are respectively disposed on the reversing and jacking assemblies and are arranged in parallel with each other; and the moving directions of the reversing roller sets are the same and perpendicular to the moving direction of directional roller set.

Further, the reversing and jacking assemblies are disposed mirror-symmetrically on the frame; two symmetrically arranged said reversing and jacking assemblies are connected by a set of said reversing roller sets; and one end of the transmission shaft segment on the two symmetrically arranged reversing and jacking assemblies is connected to the same reversing and jacking drive motor.

Further preferably, the reversing and jacking assembly connected to the reversing and jacking drive motor and another reversing and jacking assembly that is not connected to the reversing and jacking drive motor are connected by a connecting rod; and both ends of the connecting rod are respectively cam-connected with the eccentric roller of the two reversing and jacking assemblies.

Further preferably, the number of the connecting rods is two, one of which is hinged to the same side of the two eccentric rollers and the other of which is hinged to the opposite side of the two eccentric rollers.

Further, the directional roller set is mounted on the frame through the reversing and jacking assembly, and can move up and down relative to the frame.

Further preferably, the directional roller set and the reversing roller set are respectively composed of two sets of rollers, and the two sets of the rollers are respectively disposed at two ends of the jacking slider, and the opening is provided in the middle of the jacking slider.

Further, the diameter of the roller in the directional roller set is smaller than the diameter of the roller in the reversing roller set.

Further, the roller reversing and jacking device for handling equipment further comprises: a handling platform disposed on the frame; and a jacking rod disposed on the top of the jacking slider;

when the jacking slider is located at the lower end of the slider guide post, the handling platform is received on the frame; when the jacking slider is located at the upper end of the slider guide post, the handling platform is received on a jacking rod at the top of the jacking slider.

Further, the other end of the transmission shaft segment passes through the axis of the eccentric roller and is fixed to the eccentric roller. The eccentric roller is a circular or triangular structure or in other regular shape.

Further, the eccentric shaft segment is embedded in the opening through a sleeve provided thereon.

Further preferably, the eccentric shaft segment is a U-shaped structure; one end of the eccentric shaft segment is connected to the transmission shaft segment, and the other end of the eccentric shaft segment is fixed to the frame by hinge; and a sleeve is mounted in the middle of the eccentric shaft segment.

Further, under the driving action of the reversing and jacking drive motor, the eccentric shaft segment has a rotation angle of 0-180°.

Further preferably, the eccentric shaft segment has three gear positions after rotation: position (a), position (b) and position (c). When the eccentric shaft segment is at the position (a), the reversing roller set is grounded, the directional roller set is suspended, and the jacking rod is at an initial position. When the eccentric shaft segment is at the position (b), the reversing roller set is suspended, the directional roller set is grounded, and the jacking rod is raised at an intermediate position. When the eccentric shaft segment is at the position (c), the reversing roller set continues to hang upward, the directional roller set is grounded, and the jacking rod continues to rise to the highest position.

Further, the directional roller set is connected to the directional drive motor; and the reversing roller set is connected to the reversing drive motor.

The present invention adopts the above technical solutions, and has the following technical effects compared with the prior art:

The present invention provides a roller reversing and jacking device for handling equipment. Through the reversing and jacking assembly, the reversing action between the roller sets and the jacking action of the handling platform can be realized simultaneously and quickly, thereby effectively ensuring the movement symmetry and stability of the handling equipment. Moreover, the roller reversing and jacking device has novel design, compact structure, stable operation, high working efficiency and long service life. Compared with the traditional structural scheme, the overall scheme can reduce the thickness of the equipment by 35%, the weight can be reduced by 25%, and the reversing jacking time can be saved by 40%. Under the same power condition, the travel distance of the handling equipment using the roller reversing and jacking device of the present invention is about 30% higher than the conventional scheme.

Wherein, the reference numerals are:

1—frame, 2—reversing roller set, 3—directional roller set, 4—transmission shaft segment, 5—reversing and jacking drive motor, 6—directional roller drive shaft, 7—directional roller drive motor, 8—reversing roller drive shaft, 9—reversing roller drive motor, 10—eccentric roller, 11—connecting rod, 12—handling platform, 13—jacking rod, 14—slider guide post, 15—jacking slider, 16—opening, 17—eccentric shaft segment, 18—sleeve.

DETAILED DESCRIPTION OF THE INVENTION

In order to better understand the present invention, the present invention will be described in detail with reference to the specific embodiments, but the present invention is not limited to these embodiments.

Example 1

Figure 1:
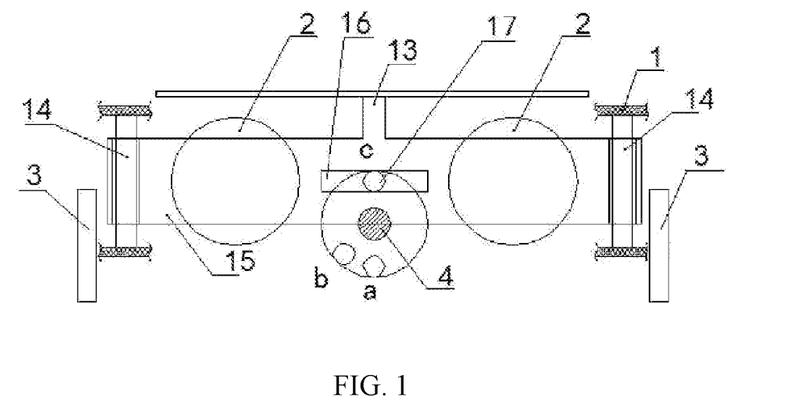
FIG. 1 is a schematic structural view of the roller reversing and jacking device for handling equipment provided with a set of reversing and jacking assembly according to the present invention.
Figure 2:
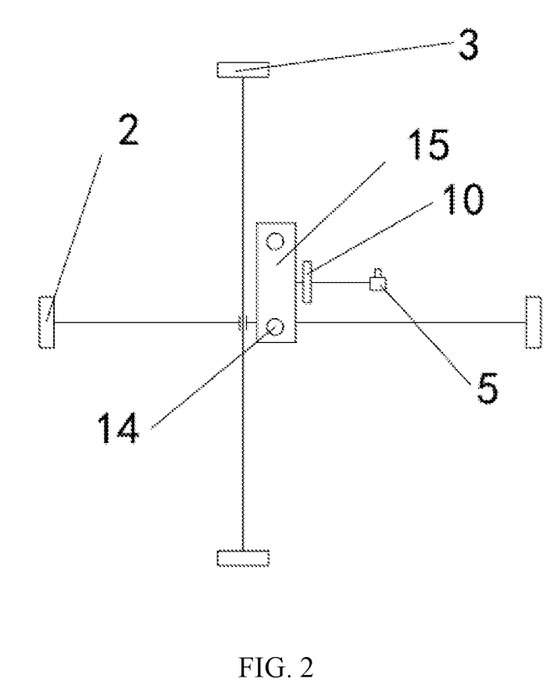
FIG. 2 is a top view of the roller reversing and jacking device for handling equipment as shown in FIG. 1.
Figure 7:
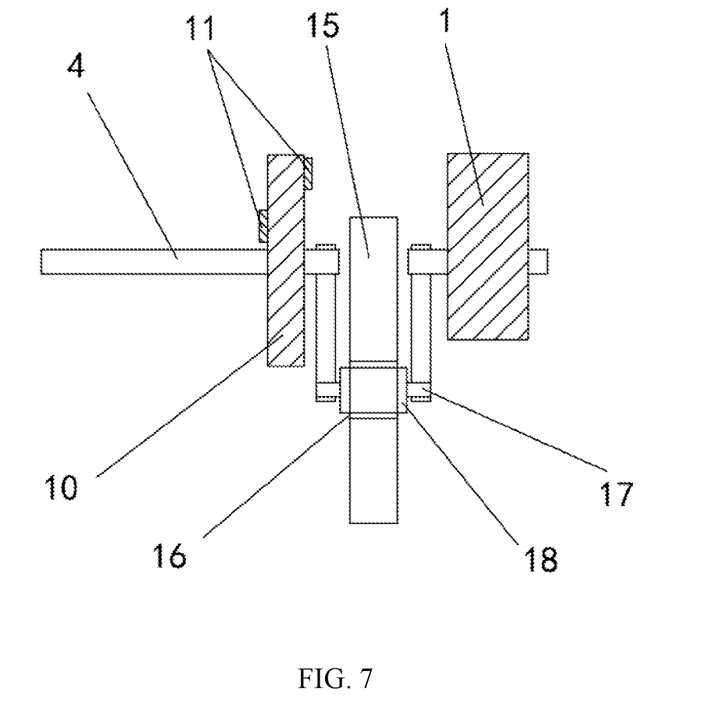
FIG. 7 is a schematic structural view of the reversing and jacking eccentric shaft and the slider guide post in the roller reversing and jacking device for handling equipment according to the present invention.
Figure 8:
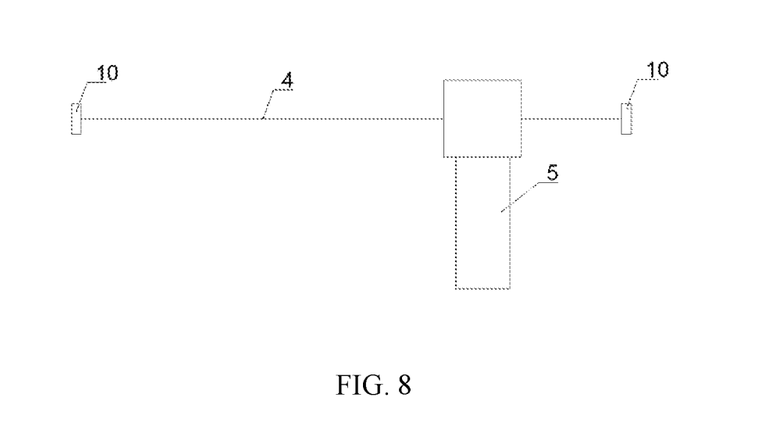
FIG. 8 is a schematic structural view of the reversing and jacking assemblies and the reversing and jacking drive motor in the roller reversing and jacking device for handling equipment according to the present invention.

As shown in FIGS. 1-2, this example provides a roller reversing and jacking device for handling equipment, which comprises a directional roller set 3 fixedly mounted on the frame 1, at least one set of reversing and jacking assemblies mounted on the frame 1, and a reversing roller set 2 which moves in different direction from the directional roller set 3, and the reversing and jacking assemblies comprise:

a jacking slider 15 restricted to and disposed on the frame 1 through a slider guide post 14, and the jacking slider 15 provided with the reversing roller set 2;

a reversing and jacking eccentric shaft correspondingly disposed on the jacking slider 15, comprising an eccentric shaft segment 17, an eccentric roller 10 and a transmission shaft segment 4, and one end of the eccentric shaft segment 17 mounted in the opening 16 in the jacking slider 15, as shown in FIG. 7; and a reversing and jacking drive motor 5 connected to one end of the transmission shaft segment 4, and the reversing and jacking drive motor 5 being fixedly mounted on the frame 1, as shown in FIG. 8;

the reversing and jacking drive motor 5 configured to drive the eccentric shaft segment 17 on the reversing and jacking eccentric shaft to rotate, which is cam motion, thereby driving the jacking slider 15 and the reversing roller set 2 thereon to move up and down with respect to the frame 1 and the directional roller set 3.

In this example, the directional roller set 3 and the reversing roller set 2 are vertically disposed, that is, the angle between the moving direction of the directional roller set 3 and the moving direction of the reversing roller set 2 is 90°, as shown in FIG. 2.

In this example, the directional roller set 3 and the reversing roller set 2 are respectively composed of two sets of rollers, and the two sets of the rollers are respectively disposed at two ends of the jacking slider 15, and the opening 16 is provided in the middle of the jacking slider 15, as shown in FIG. 1.

Figure 9:
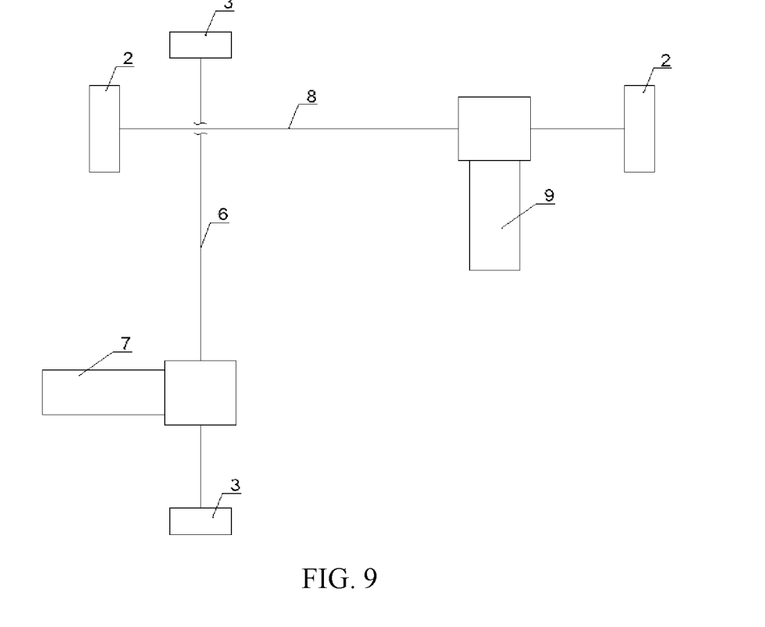
FIG. 9 is a schematic structural view of the drive motor for the directional roller set and a set of reversing and jacking assembly and the reversing roller set in the roller reversing and jacking device for handling equipment according to the present invention.

In this example, as shown in FIG. 9, the directional roller set 3 is connected to the directional drive motor 7; and the reversing roller set 2 is connected to the reversing drive motor 9. In addition, in order to achieve that the directional roller drive shaft 6 and the reversing roller drive shaft 8 do not interfere with each other in two orthogonal directions when the directional roller set 3 and the reversing roller set 2 are reversing, it is required that the rollers of the directional roller set 3 and the rollers of the reversing roller set 2 have different diameters. Preferably, the diameter of the rollers in the directional roller set 3 is smaller than the diameter of the rollers in the reversing roller set 2.

In this example, as shown in FIG. 1, the roller reversing and jacking device for handling equipment according to the present invention further comprises: a handling platform 12 disposed on the frame (1); and a jacking rod 13 disposed on the top of the jacking slider 15. When the jacking slider 15 is located at the lower end of the slider guide post 14, the handling platform 12 is received on the frame 1; when the jacking slider 15 is located at the upper end of the slider guide post 14, the handling platform 12 is received on a jacking rod 13 at the top of the jacking slider 15.

In this example, the other end of the transmission shaft segment 4 passes through the axis of the eccentric roller 10 and is fixed on the eccentric roller 10. The eccentric roller 10 is a circular or triangular structure or in other regular shape.

In this example, as shown in FIG. 7, the eccentric shaft segment 17 is embedded in the opening 16 through a sleeve 18 provided thereon. The eccentric shaft segment 17 is an U-shaped structure. One end of the eccentric shaft segment 17 is connected to the transmission shaft segment 14, and the other end of the eccentric shaft segment 17 is fixed to the frame 1 by hinge. The sleeve 18 is mounted in the middle of the eccentric shaft segment 17.

In this example, under the driving action of the reversing and jacking drive motor 5, the eccentric shaft segment 17 has a rotation angle of 0-180°, so that the eccentric shaft segment 17 can drive the jacking slider 15 to move up and down to the maximum displacement.

When the roller reversing and jacking device for handling equipment is in use, as shown in FIG. 1, the eccentric shaft segment 4 has three gear positions after rotation driven by jacking drive motor 5: position (a), position (b) and position (c), the positions a, b, and c are three positions for controlling the up-and-down lever 13 and the Y-direction roller 2. When the eccentric shaft segment 4 is rotated to the position (a), the Y-direction roller 2 is grounded, the X-direction roller 3 is suspended, and the jacking rod 13 is at an initial position. When the eccentric shaft segment 4 is rotated to the position (b), the Y-direction roller 2 is suspended, the X-direction roller 3 is grounded, and the jacking rod 13 is raised at an intermediate position. When the eccentric shaft segment 4 is rotated to the position (c), the Y-direction roller 2 continues to hang upward, the X-direction roller 3 is grounded, and the jacking rod 13 rises to the highest position.

Example 2

Figure 3:
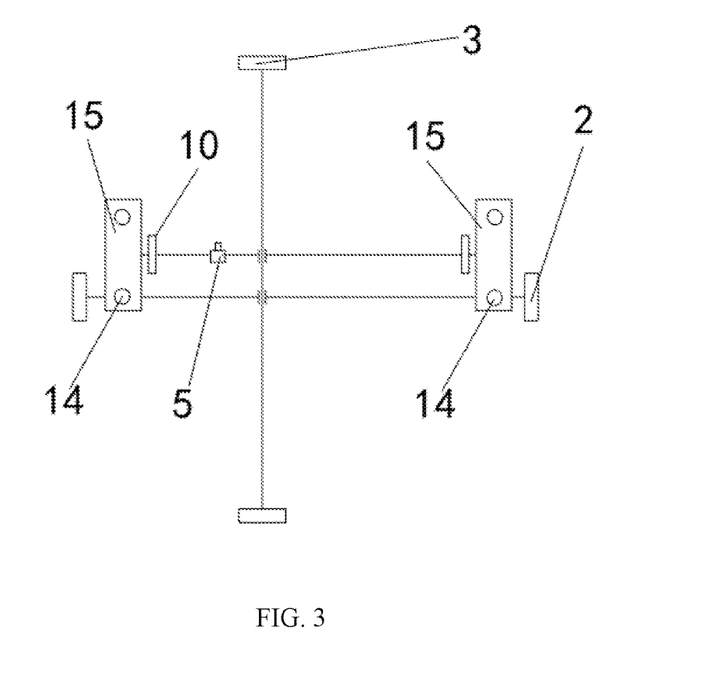
FIG. 3 is a top view of the roller reversing and jacking device for handling equipment provided with two sets of mirror-symmetrically reversing and jacking assemblies and a set of reversing roller set.

As shown in FIG. 3, it is a top view of the roller reversing and jacking device for handling equipment provided with two sets of mirror-symmetrically reversing and jacking assemblies and a set of reversing roller set, the side view of which is shown in FIG. 1. Different from the above-mentioned Example 1, the two sets of reversing and jacking assemblies are arranged mirror-symmetrically on the frame 1; the two symmetrically arranged reversing and jacking assemblies are connected by a set of reversing roller sets 2; and one end of the transmission shaft segment 4 on the two symmetrically arranged reversing and jacking assemblies is connected to the same reversing and jacking drive motor 5.

The directional roller set 3 and the reversing roller set 2 are vertically disposed, that is, the angle between the moving direction of the directional roller set 3 and the moving direction of the reversing roller set 2 is 90°, as shown in FIG. 3.

A reversing and jacking drive motor 5 is used to respectively drive the eccentric shaft segments 17 on the reversing and jacking eccentric shafts on both sides to rotate, which is cam motion, thereby simultaneously driving the jacking slider 15 and the reversing roller set 2 thereon to move up and down with respect to the frame 1 and the directional roller set 3.

When the roller reversing and jacking device for handling equipment of this example is in use, as shown in FIG. 1, the eccentric shaft segments 4 on both sides have three gear positions after rotation driven by jacking drive motor 5: position (a), position (b) and position (c). The three positions of the jacking rod 13 and the Y-direction roller 2 are controlled. When the eccentric shaft segment 4 is rotated to the position (a), the Y-direction roller 2 is grounded, the X-direction roller 3 is suspended, and the jacking rod 13 is at an initial position. When the eccentric shaft segment 4 is rotated to the position (b), the Y-direction roller 2 is suspended, the X-direction roller 3 is grounded, and the jacking rod 13 is raised at an intermediate position. When the eccentric shaft segment 4 is rotated to the position (c), the Y-direction roller 2 continues to hang upward, the X-direction roller 3 is grounded, and the jacking rod 13 rises to the highest position.

Example 3

Figure 4:
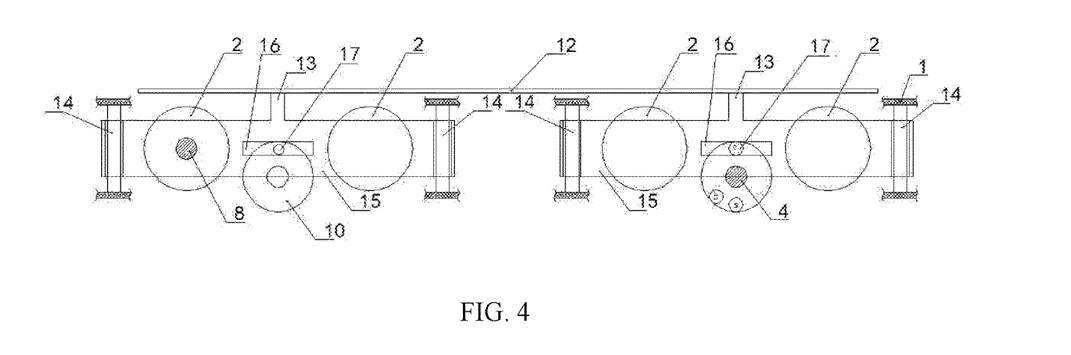
FIG. 4 is a side view of the roller reversing and jacking device for handling equipment provided with two sets of reversing and jacking assemblies arranged in parallel and two sets of reversing roller sets.

As shown in FIG. 4, it is a side view of the roller reversing and jacking device for handling equipment provided with two sets of reversing and jacking assemblies arranged in parallel and two sets of reversing roller sets. Different from the above-mentioned Example 1, there are two sets of reversing and jacking assemblies, which are arranged one behind the other. Each set of reversing and jacking assemblies is provided with a set of reversing roller sets 2. The two sets of reversing roller sets 2 are arranged in parallel with each other. The moving direction of the reversing roller sets 2 is the same ones.

The directional roller set 3 and the reversing roller set 2 are vertically disposed, that is, the angle between the moving direction of the directional roller set 3 and the moving direction of the reversing roller set 2 is 90°.

One end of the transmission shaft segment 4 of one set of reversing and jacking assemblies is connected to the reversing and jacking drive motor 5, and one end of the transmission shaft segment 4 of the other set of reversing and jacking assemblies is not connected to the reversing and jacking drive motor 5. The reversing and jacking drive motor 5 is fixedly mounted on the frame 1.

Figure 6:
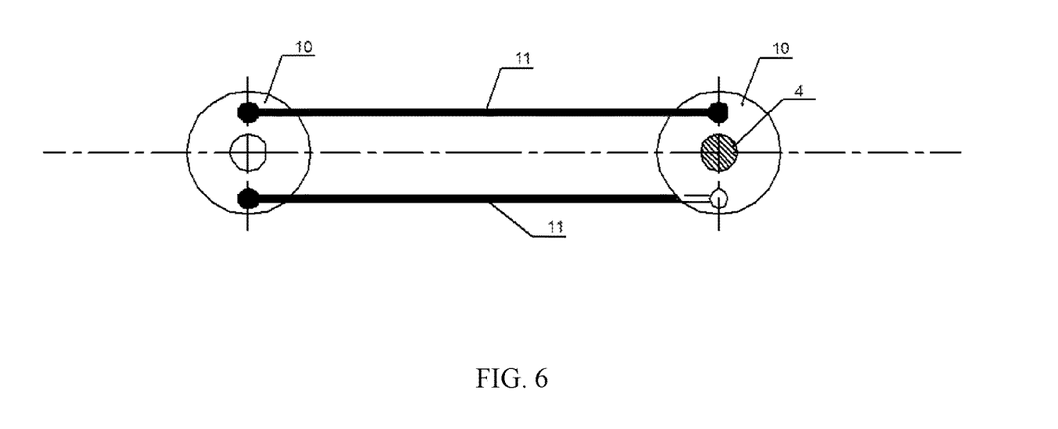
FIG. 6 is a schematic diagram of the connecting rod mechanism between two sets of reversing and jacking eccentric shafts in the roller reversing and jacking device for handling equipment according to the present invention.

As shown in FIG. 6, one set of the reversing and jacking assemblies connected to the reversing and jacking drive motor 5 and the other set of the reversing and jacking assemblies that is not connected to the reversing and jacking drive motor 5 are connected by a connecting rod 11; and both ends of the connecting rod 11 are respectively cam-connected with the eccentric roller 10 of the two reversing and jacking assemblies. Preferably, the number of the connecting rods 11 is two, one of which is hinged to the same side of the two eccentric rollers 10 and the other of which is hinged to the opposite side of the two eccentric rollers 10.

A reversing and jacking drive motor 5 is used to drive the eccentric shaft segment 17 on the reversing and jacking eccentric shaft to rotate, which is cam motion, thereby driving the jacking slider 15 and the reversing roller set 2 thereon to move up and down with respect to the frame 1. At the same time, the jacking slider 15 of the other set of reversing and jacking assemblies and the reversing roller set 2 thereon are driven to move up and down by the connecting rod 11 relative to the frame 1.

Figure 11:
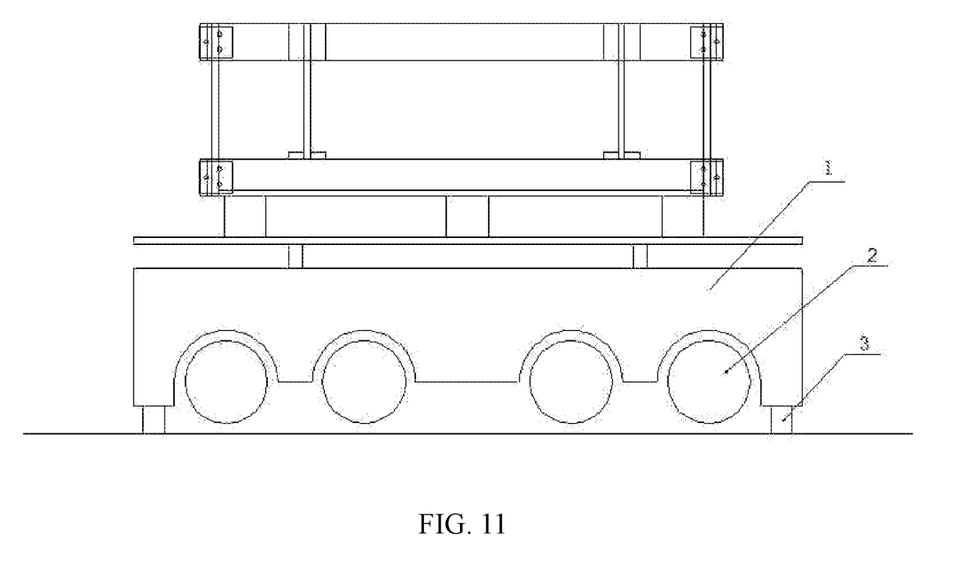
FIG. 11 is a view showing the working state of the equipment when the eccentric shaft segment of the roller reversing and jacking device for handling equipment is rotated to the position (b) according to the present invention.
Figure 12:
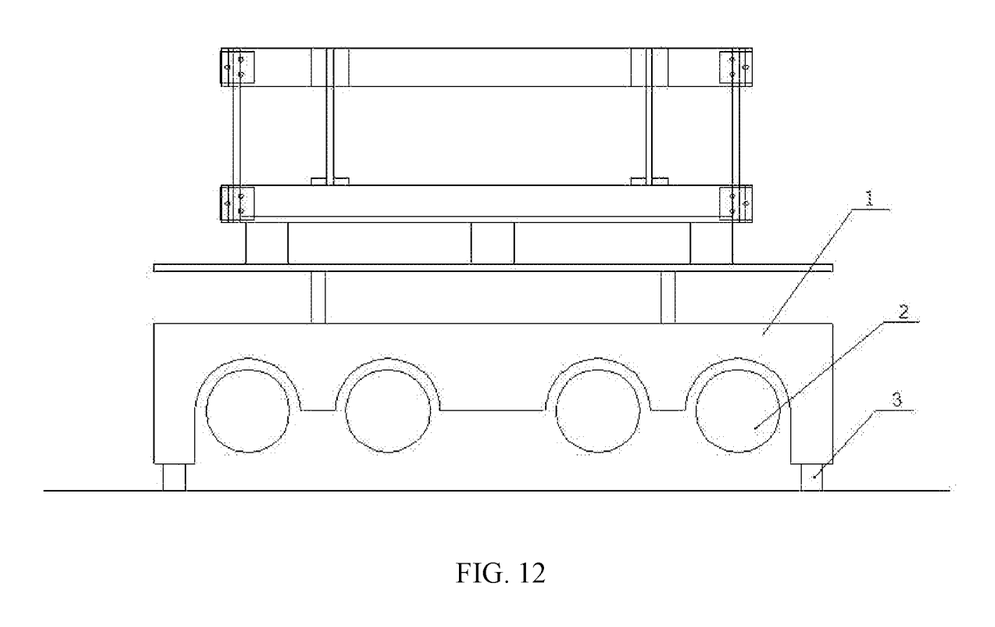
FIG. 12 is a view showing the working state of the equipment when the eccentric shaft segment of the roller reversing and jacking device for handling equipment is rotated to the position (c) according to the present invention.

When the roller reversing and jacking device for handling equipment of this example is in use, as shown in FIGS. 11-13, the eccentric shaft segments 4 on both sides have three gear positions after rotation driven by jacking drive motor 5: position (a), position (b) and position (c). The three positions of the jacking rod 13 and the Y-direction roller 2 are controlled. When the eccentric shaft segment 4 is rotated to the position (a), the Y-direction roller 2 is grounded, the X-direction roller 3 is suspended, and the jacking rod 13 is at an initial position. When the eccentric shaft segment 4 is rotated to the position (b), the Y-direction roller 2 is suspended, the X-direction roller 3 is grounded, and the jacking rod 13 is raised at an intermediate position. When the eccentric shaft segment 4 is rotated to the position (c), the Y-direction roller 2 continues to hang upward, the X-direction roller 3 is grounded, and the jacking rod 13 rises to the highest position.

Example 4

Figure 5:
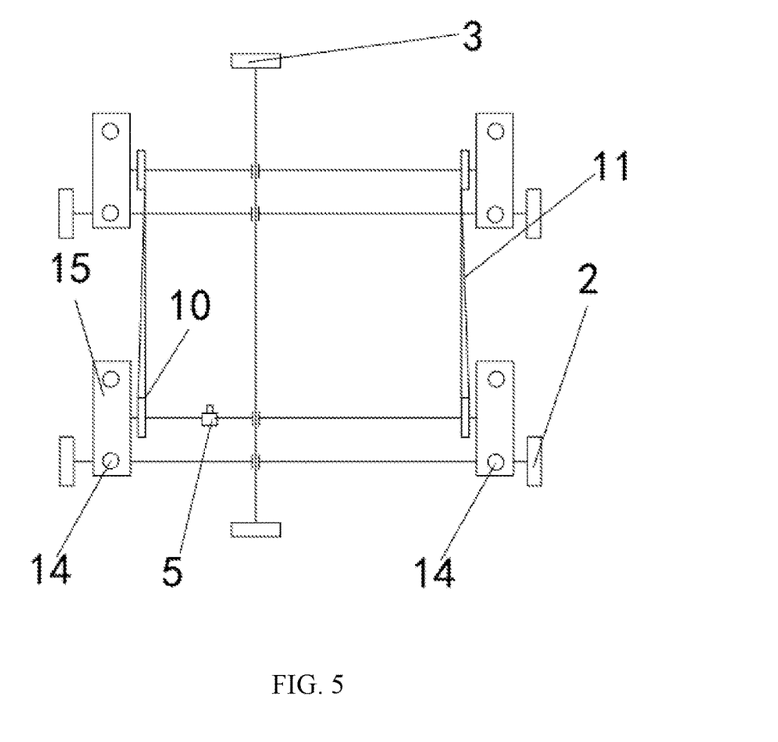
FIG. 5 is a side view of the roller reversing and jacking device for handling equipment provided with four sets of reversing and jacking assemblies arranged in parallel and two sets of reversing roller sets.

As shown in FIG. 5, it is a side view of the roller reversing and jacking device for handling equipment provided with four sets of reversing and jacking assemblies arranged in parallel and two sets of reversing roller sets. Different from the above-mentioned Example 3, there are four sets of reversing and jacking assemblies, which are arranged one behind another. Two sets of reversing and jacking assemblies are provided with a set of reversing roller sets 2. The two sets of reversing roller sets 2 are arranged in parallel with each other. The moving direction of the reversing roller sets 2 is the same.

Wherein, two symmetrically arranged reversing and jacking assemblies are connected by a set of reversing roller sets 2. One end of the transmission shaft segment 4 on the two symmetrically arranged reversing and jacking assemblies is connected to the same reversing and jacking drive motor 5. The reversing and jacking drive motor 5 is fixedly mounted on the frame 1. The other two symmetrically arranged reversing and jacking assemblies are connected by the other set of reversing roller sets 2, and one end of the transmission shaft segment 4 on the two symmetrically arranged reversing and jacking assemblies is not connected to the reversing and jacking drive motor 5.

The directional roller set 3 and the two sets of the reversing roller sets 2 are vertically disposed, that is, the angles between the moving direction of the directional roller set 3 and the moving direction of the reversing roller sets 2 are 90°, as shown in FIG. 5.

The two reversing and jacking assemblies arranged on the left and right sides are respectively connected by connecting rods 11. Both ends of the connecting rods 11 are respectively cam-connected with the eccentric roller 10 of the two reversing and jacking assemblies. The number of the connecting rods 11 is two, one of which is hinged to the same side of the two eccentric rollers 10 and the other of which is hinged to the opposite side of the two eccentric rollers 10.

A reversing and jacking drive motor 5 is used to drive the eccentric shaft segment 17 on the reversing and jacking eccentric shaft to rotate, which is cam motion, thereby driving the jacking slider 15 and the reversing roller set 2 thereon to move up and down with respect to the frame 1. At the same time, the jacking slider 15 of another set of reversing and jacking assemblies and the reversing roller set 2 thereon are driven to move up and down by the connecting rod 11 relative to the frame 1.

Figure 10:
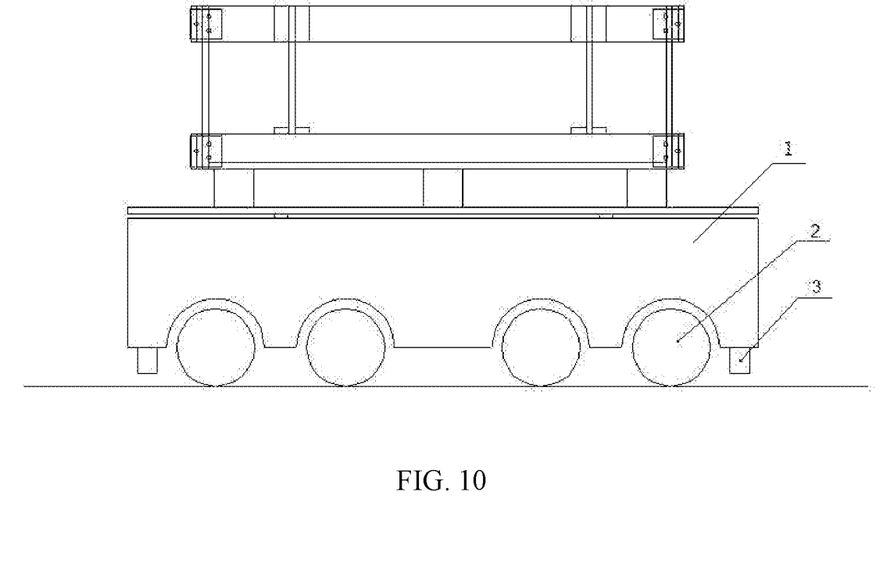
FIG. 10 is a view showing the working state of the equipment when the eccentric shaft segment of the roller reversing and jacking device for handling equipment is rotated to the position (a) according to the present invention.

When the roller reversing and jacking device for handling equipment of this example is in use, as shown in FIGS. 10-12, the four eccentric shaft segments 4 on both sides have three gear positions after rotation driven by jacking drive motor 5: position (a), position (b) and position (c). The three positions of the jacking rod 13 and the Y-direction roller 2 are controlled. When the eccentric shaft segment 4 is rotated to the position (a), the Y-direction roller 2 is grounded, the X-direction roller 3 is suspended, and the jacking rod 13 is at an initial position. When the eccentric shaft segment 4 is rotated to the position (b), the Y-direction roller 2 is suspended, the X-direction roller 3 is grounded, and the jacking rod 13 is raised at an intermediate position. When the eccentric shaft segment 4 is rotated to the position (c), the Y-direction roller 2 continues to hang upward, the X-direction roller 3 is grounded, and the jacking rod 13 rises to the highest position.

The specific embodiments of the present invention have been described in detail above, but are merely exemplary, and the invention is not limited to the specific embodiments described above. Any equivalent modifications and substitutions to the invention are also within the scope of the invention. Accordingly, any equivalents and modifications made without departing from the spirit and scope of the invention are intended to be included within the scope of the present invention.

The invention claimed is:

1. A roller reversing and jacking device for handling equipment, comprising a directional roller set fixedly mounted on a frame, at least one set of reversing and jacking assemblies mounted on the frame and a reversing roller set which moves in different direction from the directional roller set, the at least one set of reversing and jacking assemblies comprising:
    a jacking slider restricted to and disposed on the frame through a slider guide post, and the jacking slider provided with the reversing roller set;
    a reversing and jacking eccentric shaft correspondingly disposed on the jacking slider, comprising an eccentric shaft segment, an eccentric roller and a transmission shaft segment, and one end of the eccentric shaft segment mounted in an opening in the jacking slider; and
    a reversing and jacking drive motor connected to or disconnected from one end of the transmission shaft segment, and the reversing and jacking drive motor fixedly mounted on the frame;
    wherein the reversing and jacking drive motor configured to drive the eccentric shaft segment on the reversing and jacking eccentric shaft to rotate, thereby driving the jacking slider and the reversing roller set thereon to move up and down with respect to the frame and the directional roller set.

2. The roller reversing and jacking device for handling equipment according to claim 1, wherein the reversing and jacking assemblies are at least two sets; the reversing roller sets are respectively disposed on the reversing and jacking assemblies and are arranged in parallel with each other; and moving directions of the reversing roller sets are the same and perpendicular to the moving direction of directional roller set.

3. The roller reversing and jacking device for handling equipment according to claim 1, wherein the reversing and jacking assemblies are disposed mirror-symmetrically on the frame; two symmetrically arranged reversing and jacking assemblies are connected by a set of said reversing roller sets; and one end of the transmission shaft segment on the two symmetrically arranged reversing and jacking assemblies is connected to the reversing and jacking drive motor.

4. The roller reversing and jacking device for handling equipment according to claim 1, wherein the reversing and jacking assembly connected to the reversing and jacking drive motor and another reversing and jacking assembly that is not connected to the reversing and jacking drive motor are connected by a connecting rod; and both ends of the connecting rod are respectively cam-connected with the eccentric roller of the two reversing and jacking assemblies.

5. The roller reversing and jacking device for handling equipment according to claim 4, wherein a number of the connecting rods is two, one of which is hinged to the two eccentric rollers on the sides of same direction of the two eccentric rollers and the other of which is hinged to the two eccentric rollers on the sides of opposite directions of the two eccentric rollers.

6. The roller reversing and jacking device for handling equipment according to claim 1, wherein the directional roller set is mounted on the frame through the reversing and jacking assembly, and is able to move up and down relative to the frame.

7. The roller reversing and jacking device for handling equipment according to claim 1, wherein the directional roller set and the reversing roller set are respectively composed of two sets of rollers, and the two sets of the rollers are respectively disposed at two ends of the jacking slider, and the opening is provided in a middle of the jacking slider.

8. The roller reversing and jacking device for handling equipment according to claim 1, wherein a diameter of the roller in the directional roller set is smaller than a diameter of a roller in the reversing roller set.

9. The roller reversing and jacking device for handling equipment according to claim 1, further comprising:
   a handling platform disposed on the frame; and
   a jacking rod disposed on a top of the jacking slider;
   when the jacking slider is located at a lower end of the slider guide post, the handling platform is received on the frame; when the jacking slider is located at an upper end of the slider guide post, the handling platform is received on the jacking rod at the top of the jacking slider.

10. The roller reversing and jacking device for handling equipment according to claim 1, wherein the eccentric shaft segment is a U-shaped structure; one end of the eccentric shaft segment is connected to the transmission shaft segment, and another end of the eccentric shaft segment is hingedly fixed to the frame; and a sleeve is mounted in a middle of the eccentric shaft segment.

11. The roller reversing and jacking device for handling equipment according to claim 1, wherein the reversing and jacking assemblies are disposed mirror-symmetrically on the frame; two symmetrically arranged reversing and jacking assemblies are connected by a set of said reversing roller sets; and one end of the transmission shaft segment on the two symmetrically arranged reversing and jacking assemblies is connected to the reversing and jacking drive motor.

12. The roller reversing and jacking device for handling equipment according to claim 1, wherein the reversing and jacking assembly connected to the reversing and jacking drive motor and another reversing and jacking assembly that is not connected to the reversing and jacking drive motor are connected by a connecting rod; and both ends of the connecting rod are respectively cam-connected with the eccentric roller of the two reversing and jacking assemblies.

\* \* \* \* \*